Dec. 24, 1946.  T. L. URQUHART  2,413,088
BLOWTORCH MACHINE FOR CUTTING METAL WORK PIECES
Filed Dec. 13, 1943  5 Sheets-Sheet 4

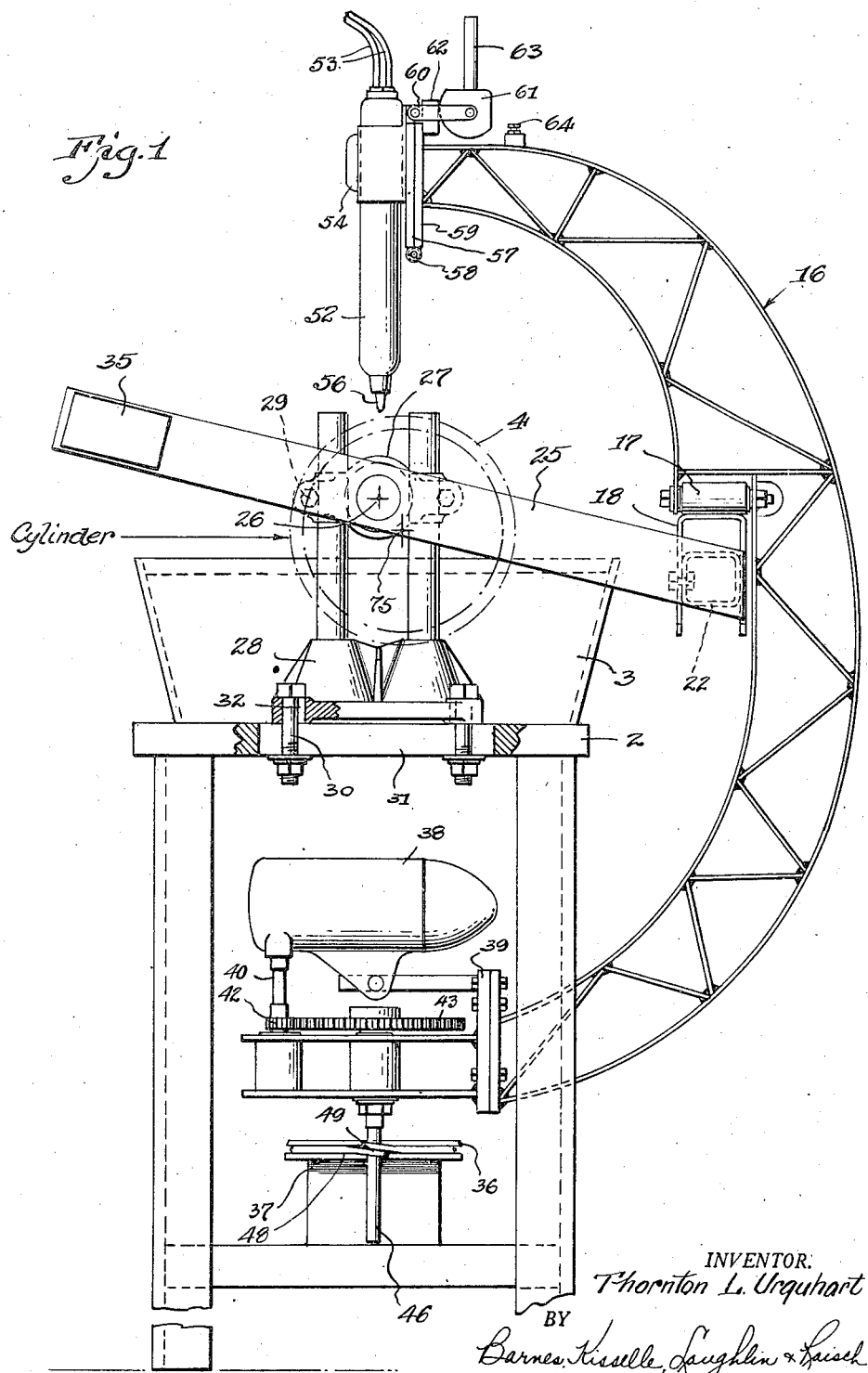

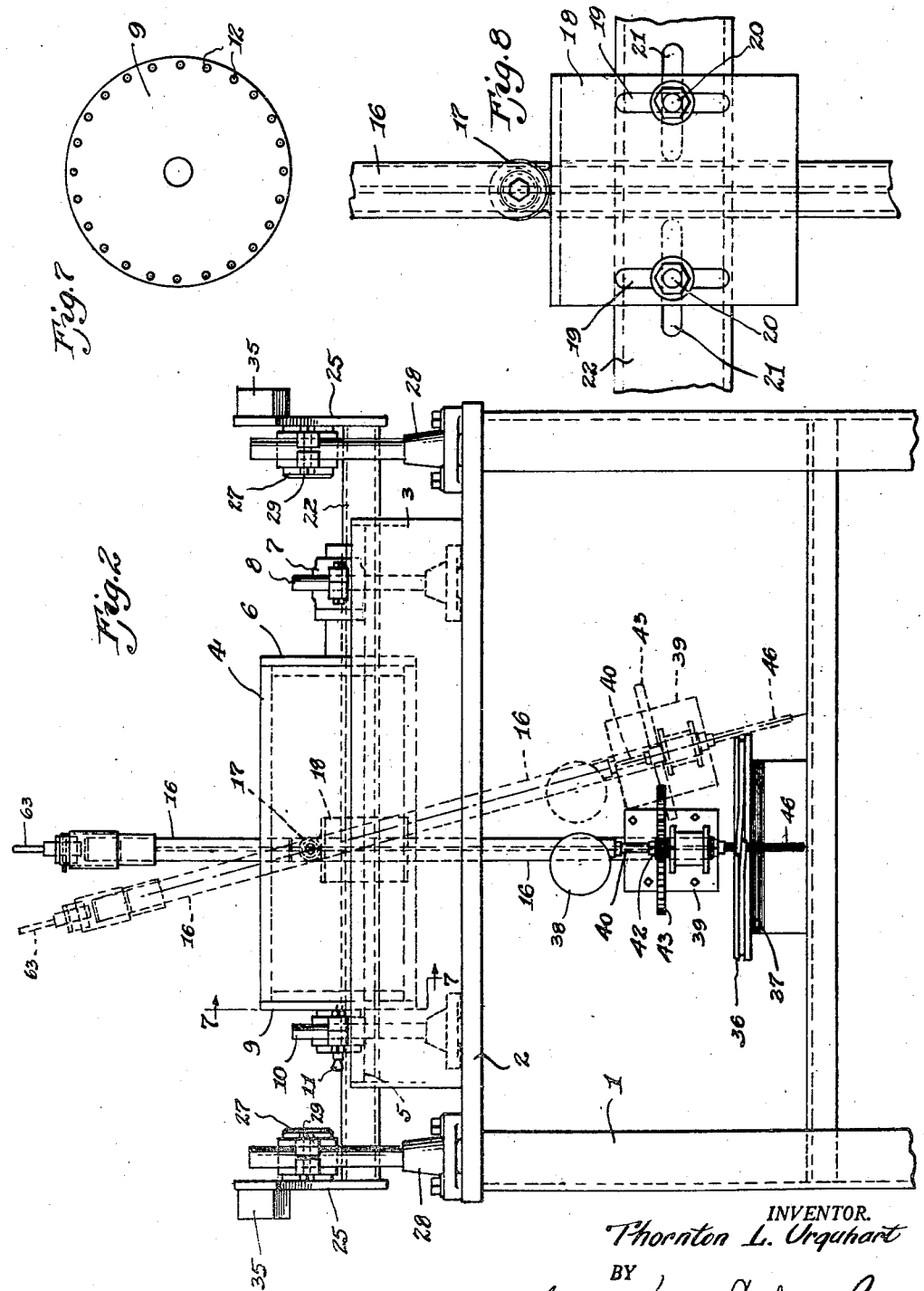

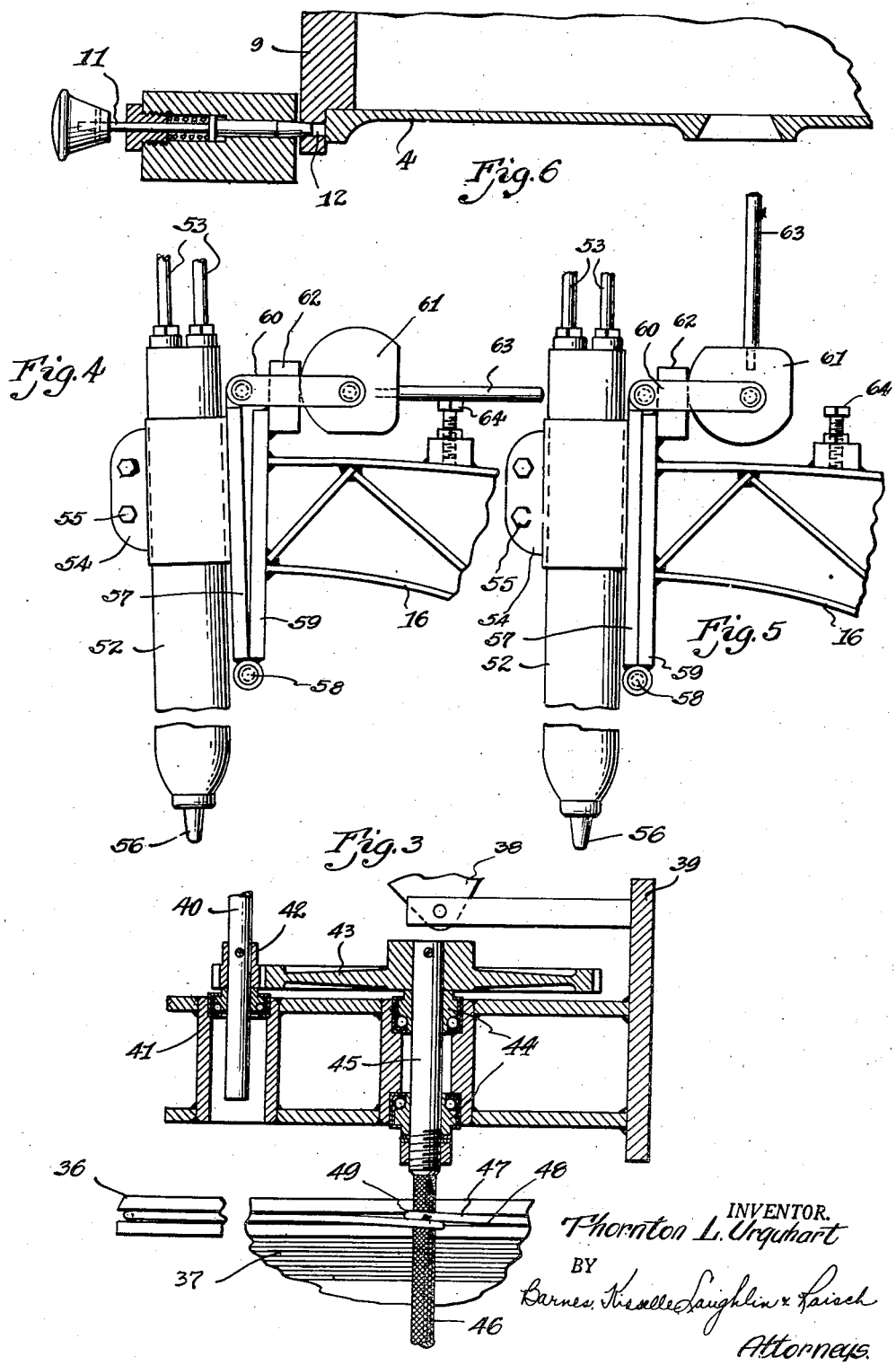

INVENTOR.
Thornton L. Urquhart
BY
Barnes, Kisselle, Laughlin & Raisch
Attorneys.

Dec. 24, 1946.     T. L. URQUHART     2,413,088
BLOWTORCH MACHINE FOR CUTTING METAL WORK PIECES
Filed Dec. 13, 1943     5 Sheets-Sheet 5
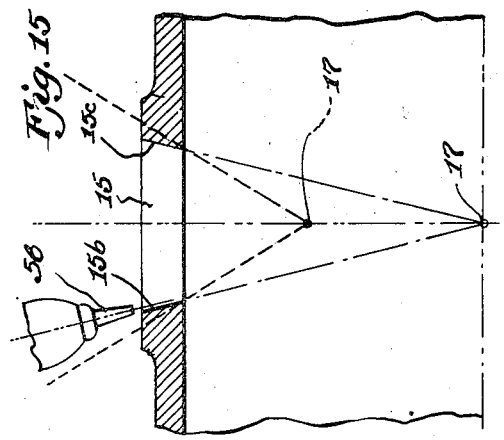
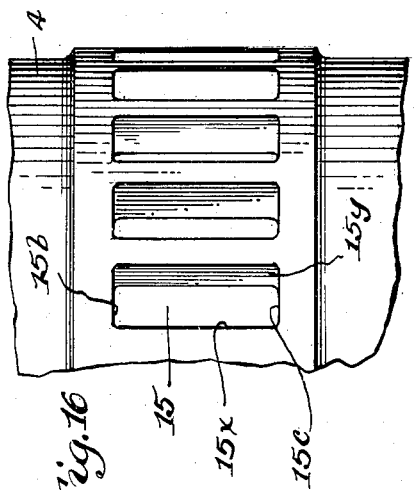
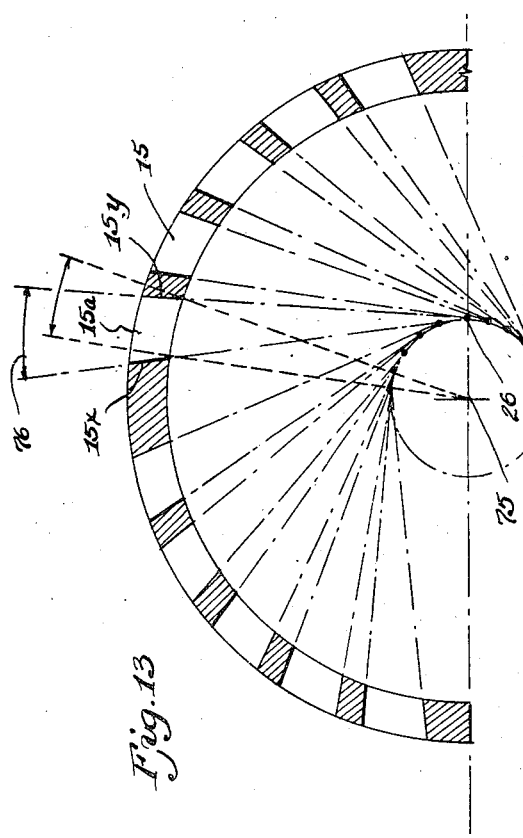
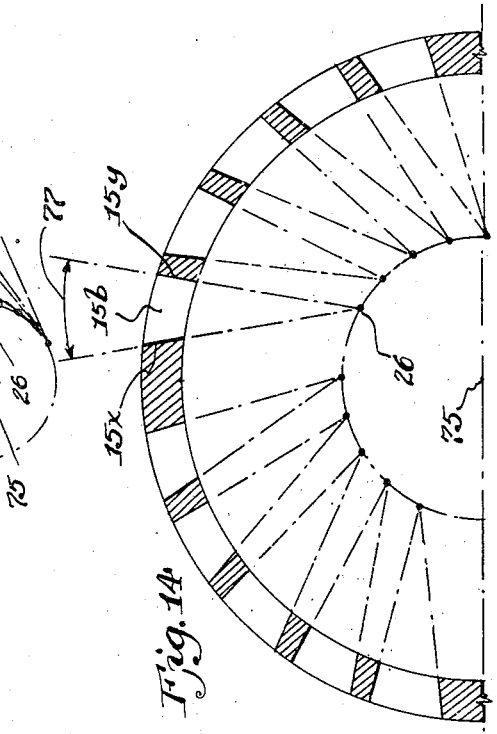
INVENTOR.
Thornton L. Urquhart
BY
Barnes, Kisselle, Laughlin & Raisch
Attorneys.

Patented Dec. 24, 1946

2,413,088

UNITED STATES PATENT OFFICE 2,413,088

BLOWTORCH MACHINE FOR CUTTING METAL WORKPIECES

Thornton L. Urquhart, Detroit, Mich., assignor to Taylor-Winfield Corporation, Warren, Ohio, a corporation of Ohio Application December 13, 1943, Serial No. 514,027

6 Claims. (Cl. 266—23)

This invention relates to the cutting of metal and it has to do particularly with the cutting of metal by a flame. In accordance with the invention the metal may be cut along a line of any desired form or shape or along a closed path or line so as to form a hole in the metal which may subsequently be called and serve the purpose of an aperture or port.

The overall object of the invention is to provide an improved apparatus for causing a cutting flame to traverse the work in a desired path to cut the same as the flame moves. The invention is applicable to and perhaps displays most of its features in connection with the cutting of a hole in a cylindrical piece of work, such for example, the cutting of a port in the cylinder of a Diesel engine. In accordance with the invention the size of the hole which is cut and the shape of the hole is determined by a template of much larger size than the hole itself, and by making certain adjustments, as for example, shifting the template, the size of the hole may be varied and indeed corrections may be made by template adjustment to take care of template inaccuracies. Also the angularity of the walls of the hole can be varied relative to each other, and the axis or center line through a hole may be changed as to direction. This latter function is important in the forming of a port in an engine cylinder since it is usually desired that the port direct the incoming gas toward the central portion of the cylinder tangentially on a given radius from the center of the cylinder. These points will be particularly appreciated as the detailed discussion progresses.

In order to disclose the invention, an apparatus is shown herein for cutting holes or ports in an engine cylinder, although it is to be appreciated that the invention is not limited to cylinders as work pieces except as recited in the claims appended hereto. The invention is applicable to cutting the metal by any suitable flame of combustion, such as any oxygen flame, and for example an oxyacetylene flame.

In the accompanying drawings:

Fig. 1 is a side elevational view of an apparatus constructed in accordance with the invention and showing the cylindrical work piece in position.

Fig. 2 is a front elevational view of the apparatus showing different positions of some of the parts.

Fig. 3 is a detailed view largely in cross-section showing the driving mechanism for propelling the apparatus in its movements.

Fig. 4 is a view illustrating the torch mounting and showing one position of adjustment.

Fig. 5 is a view similar to Fig. 4 showing another adjusted position of the torch.

Fig. 6 is a detailed view in section showing the work carrier and indexing means.

Fig. 7 is a cross-section view taken on line 7—7 of Fig. 2 showing the indexing plate.

Fig. 8 is a detailed view showing a form of adjustable mounting of the pivot about which the torch rocks in some of its movements.

Fig. 13 is a diagrammatic view of a sectional nature showing a plurality of ports in an engine cylinder and illustrating how the ports are directed tangentially on a radius about the center of the cylinder.

Fig. 14 is a view similar to Fig. 13 showing ports formed by a different adjustment.

Fig. 15 is a diagrammatic view illustrating how a certain adjustment varies the angle of the walls of the support relative to each other.

Fig. 16 is a partial elevation of a cylinder with ports formed therein.

Figure 9:
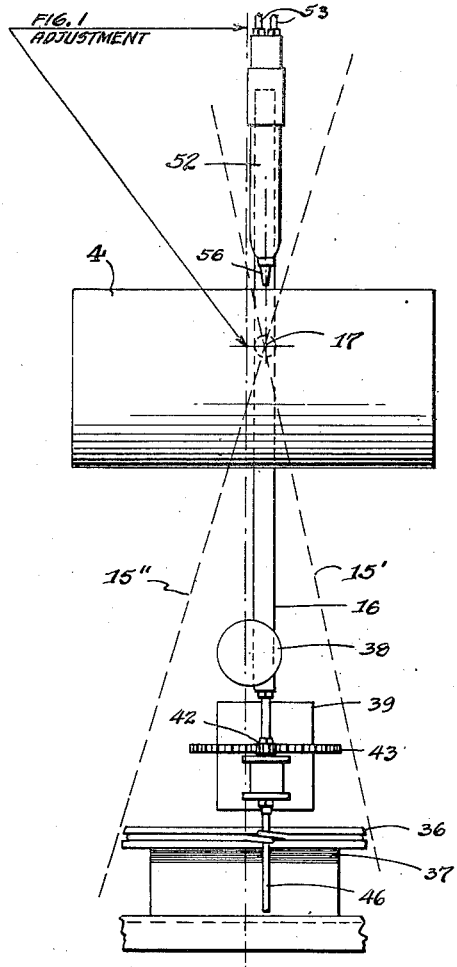
Fig. 9 is a view largely diagrammatic in nature, illustrating movements of the torch as controlled by the template.

The apparatus is one form of machine for carrying out the invention and it comprises suitable supports 1 upon which there may be a table or bed 2. A vessel in the nature of a tank 3 is disposed on the table, and where the work piece is a cylinder, such as an engine cylinder, as illustrated at 4, it is partially submerged in a liquid, such as water contained in the tank. The liquid level may be substantially at the line 5. The work piece is supported at its ends by an engaging member 6, rotatably mounted as at 7 on a bracket 8 and a work engaging piece 9, similarly rotatably mounted on a bracket 10. The member 6 may be retracted to the right as Fig. 2 is viewed, so that a cylinder may be positioned or removed, and a suitable indexing means as shown in Fig. 6 is used for determining a step by step rotary adjustment of the cylinder. The indexing means comprises a spring pressed plunger 11, adapted to engage in any one of a series of openings 12 in the member 9. Thus the cylinder can be rotatably adjusted step by step and its lower portion is submerged in the liquid.

The cylinder is to have a plurality of ports formed therein, as illustrated in Fig. 13, the ports being generally indicated at 15. There is an adjustably moveable arm or frame 16 which may have roughly the shape of a C as shown in Fig. 1. This frame is mounted for rocking movement on two axes which are positioned at right angles to each other. One pivotal mounting is at 17, the axis of which is transverse to the axis of the cylinder. The pivot point at 17 can be adjusted both vertically and horizontally. To this end the pivot is mounted on a bracket 18 provided with vertically extending slots 19, and bolts 20 pass through the slots 19 and through horizontal slots 21 in a supporting cross-bar 22. It will be understood that by loosening the bolts the bracket 18 may be adjusted relative to the cross-bar 20 both horizontally and vertically.

This supporting arm is carried through the means of rocker arms 25 attached to opposite ends of the cross-bar 20. The rocker arms are pivotally mounted as at 26 through the means of bearing blocks 27, each mounted on a bracket structure 28. The bearing blocks may be vertically adjusted on the brackets by loosening and then tightening the clamping bolts 29. The brackets can be adjusted horizontally in a direction traverse of the axis of the cylinder, by reason of the holding bolts 30 connecting the brackets 28 to the table 2, the bolts passing through the slot 31 in the table and for that matter, through elongated openings in the base of the bracket as shown at 32. The adjustments thus illustrated for the two pivotal mountings of the arm are elementary and simple in nature, and where quick adjustments are desired the adjusting structure may be refined. However, the machine may be set up for operating over a long period of time on a given type of work so that adjustments may be needed only infrequently. The purpose of these adjustable features will presently appear.

In describing the adjustments as vertical and horizontal, it will be understood that these terms are used in a relative sense. If for example the entire machine be tipped angularly the two adjusting movements still fall within these terms.

The pivotally mounted structure is preferably nicely balanced for minimum of resistance in the pivotal action and to this end the arms 25 may extend beyond the axis 26 and may be counterweighted at 35. In the cutting of a hole in the piece of work the arm 16 is oscillated on the two axes to cause the flame to traverse the work piece in the desired path. The control of the oscillations is obtained by the use of a template 36 which is preferably adjustably mounted. The adjustment of the template is vertical and a simple means is shown herein, comprising a support of laminated nature as shown in 37. By removing or inserting laminations the vertical position of the template may be varied. By tilting the template on its long or short axis the dimension width and length respectively of the hole to be cut may be varied. This template has the shape of the hole to be cut, but of course it is much larger as will presently appear. Suitable power means is provided for causing the oscillation of the arm as controlled by the template and to this end a small electrical motor 38 is mounted on the lower end of the arm 16 as by means of a bracket structure 39. This motor has a drive shaft 40 and the driven means is illustrated in detail in Fig. 3. Here will be seen that the drive shaft has a bearing 41 in the bracket structure and a pinion 42 which meshes with a larger gear 43 journaled in the bracket structure as at 44 through the means of a shaft 45. The shaft has a depending, roughened, or knurled part 46 which projects downwardly adjacent the side of the template 36. As the motor operates the knurled portion 46 engages the side of the template and propels itself around the peripheral edge of the templates. To facilitate this action, an elastic band 47 is disposed in a groove 48 in the template and the band is looped around the shaft as at 49. This holds the shaft in frictional engagement with the sides of the template and the turning of the knurled portion 46 in the loop causes a continuous winding and unwinding function.

A suitable torch 52, having flexible conduits 53 for the introduction of the gases, is carried by a bracket 54 in turn supported by the upper end of the arm 16. The torch body is adjustable in the bracket by the clamping bolts 55 so that the torch tip may be positioned in the desired close proximity to the work. The bracket is movably mounted on the arm 16 for movement through a limited range of travel and this structure is shown in Figs. 4 and 5. The bracket includes a part 57 in the nature of a hinge butt pivoted as at 58 to another member 59 similar to a hinge butt and fixedly mounted on the arm 16. One or more links 60 connect the member 57 with a cam 61 operating against a fixed abutment 62. This cam has a controlling member 63 arranged to abut an adjustable limit screw 64. When the cam is turned to the position as shown at Fig. 4 the upper end of the torch swings outwardly from the arm 16, while the tip swings toward the arm 16 the extent of this movement is determined by the screw 64. This is the starting position. As the cam is turned from the Fig. 4 to the Fig. 5 position, the torch is shifted from the Fig. 4 position to the Fig. 5 position, and in this movement, the torch tip 56 moves outwardly away from the arm 16.

Figure 17:
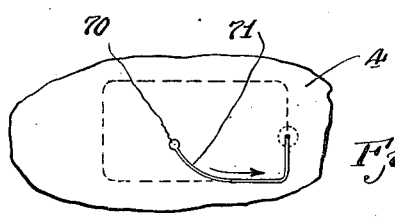
Fig. 17 is a detailed view illustrating how the cutting of an aperture or hole in a work piece is started.

It will be observed that as the shaft 45 traverses the template that the arm 16 is caused to swing both on the axis 17 and the axis 26. As the front edge of the template is traversed as Fig. 2 is viewed, the arm swings on the axis 17; as an end edge of the template is traversed as Fig. 1 is viewed, the arm swings on the axis 26. Accordingly the torch tip moves in a path which is of the same shape as the template but smaller because of the difference in the radii of the template and the torch tip from the axes of oscillation. Accordingly, a fairly large template can be made and any errors therein are minimized in the resulting hole. Moreover, the raising and lowering of the template makes corrections for variations in template size. The size of the hole which is cut can be varied by adjusting the elevation of the templates. As the template is adjusted upwardly the size of the hole is increased; as the template is adjusted downwardly the size of the hole is decreased. Thus if the template is of rectangular form the torch will traverse a rectangular path and cut a hole in the piece of work as illustrated in Fig. 17.

To commence the operation the work piece is first preferably provided with the aperture 10, located within the area of the cut. By adjusting the torch to the position shown in Fig. 4, the flame is then directed at the aperture. Then the motor 38 is set into operation and the oscillation of the arm starts and the operator, grasping the handle 63 gradually shifts the cam to the Fig. 5 position. This causes the flame to travel along an arcuate path forming a kerf in the work as shown at 71, which kerf gradually comes into the desired line of cut for the hole substantially on a tangent. Thus no recess or indentation is caused by excessive burning at the point where the operation is started.

The adjustable features of the apparatus as mentioned above, are particularly advantageous in cutting one or more apertures in a cylinder. For example, as shown in Fig. 13, the cylinder is provided with a plurality of circumferentially spaced air inlet apertures. In some instances as shown, it is the desire that the direction or center line of each of the apertures extend, not toward the center of the cylinder, but toward a point on a radius from the center of the cylinder so that the center line of the aperture, if extended, reaches a central portion of the cylinder on a tangent. As shown in Fig. 13, the center of the cylinder is at 75. The aperture now positioned to be cut is the aperture 15a. The angular disposition of the long sides 15y and 15x of the aperture relative to each other and relative to a radial line of the cylinder is controlled by the position of the axis 26. The axis 26 is shown in Fig. 13 on the horizontal center line of the cylinder but displaced on a radius to the right as the figure is viewed. Accordingly the two side walls 15x and 15y of the aperture are in planes which, if extended meet substantially at the point 26. The position of the long sides of the aperture are illustrated by the extended lines indicated by the arrow 76. If the axis 26 is shifted further to the right as Fig. 13 is viewed, the radius of the swirl of the incoming gas is increased. A further example is shown in Fig. 14 where the center 26 has been adjusted upwardly, and the side walls extended, intersect at the axis. Moreover, the elevation of the axis 26 increases the angularity of the side walls relative to each other, as shown by the extended lines indicated by the arrow 77. These views are given to merely exemplify the results and features, and are not intended to depict any theory in Diesel engine construction. It will be apparent that if the axis 26 is made to co-incide with cylinder center 75, the cut will be radial. Innumerable adjustments can be made from various directions within the limits of the adjustment of the mechanism.

Figure 11:
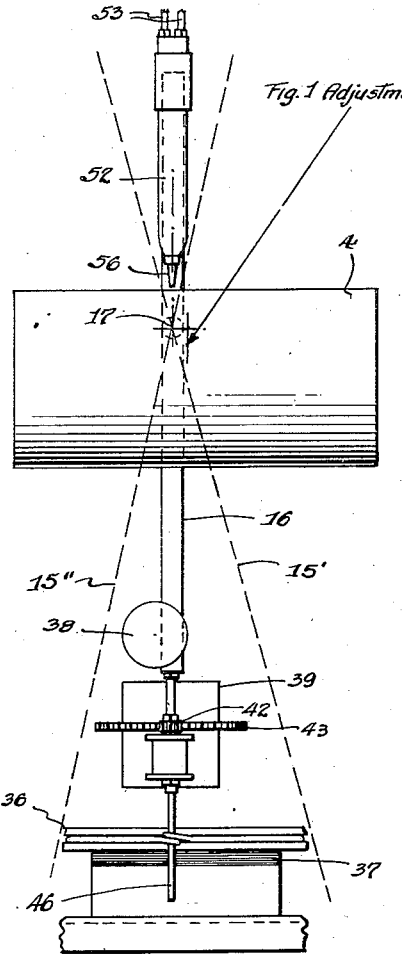
Fig. 11 is a view similar to Fig. 9 showing the template in another position.
Figure 10:
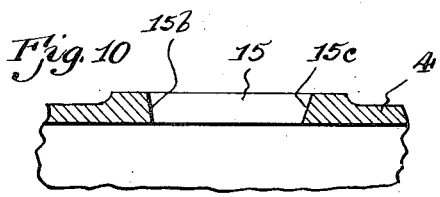
Fig. 10 is an enlarged and slightly exaggerated cross-sectional view of a hole or port cut by the template shown in Fig. 9.
Figure 12:
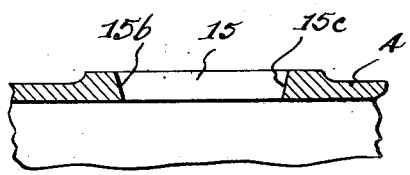
Fig. 12 is a cross-sectional view similar to Fig. 10 showing a port cut by adjustment of Fig. 11.

The position of the axis 17 governs the nature of the side walls at the ends of the opening. As shown in Figs. 1 and 8 the axis 17 has a central adjustment. In Fig. 9 the axis 17 has been adjusted to the right. This has the effect of decreasing the angularity of the end wall 15b and increasing the angularity of the opposite end wall 15c. In Fig. 11 the axis 17 has been adjusted to the left with respect to the position shown in Fig. 1, and this has the effect of straightening up the end wall 15c and increasing the angularity of the end wall 15b. The lines of cut made by the flame of the two end walls are extended and indicated respectively at 15' and 15''. Vertical adjustment of the axis 17 changes the angularity of the end walls 15c and 15b relative to each other as indicated in Fig. 15. In this view an elevated position and the lines of cut are shown in dotted lines.

Thus an apparatus is provided for cutting holes by a flame in metal work pieces and which apparatus has such flexibility of adjustment that various sized holes and various shaped holes may be provided. This flexibility of adjustment readily adapts the apparatus to cutting holes in cylinders as the axis or center lines of the holes may be directed on to the center or tangentially as desired. To briefly reiterate, it may be said that; the template determines the shape of the hole; adjustment of the template determines the size of the hole and serves to correct errors in the size of the template; raising and lowering of the template changes the distance of the template from the pivots 17 and 26, and a shorter distance or longer distance respectively results in greater movement or lesser movement of the torch tip 56; the angularity of two opposite sides of the hole may be varied by vertical adjustment of the axis 17, while maintaining a similar relationship between the angularity of these two sides and a vertical line through the hole; the angularity of these two sides of the hole may be varied with respect to a vertical line through the hole by a lateral adjustment of the axis 17; the angularity of the two other opposite sides of the hole may be varied relative to each other by the vertical adjustment of the axis 26; the relationship of the last mentioned two sides of the hole relative to each other and relative to a radial line through the hole is variable by the lateral adjustment of the axis 26.

In cutting the cylinder, spatter of molten metal and the like, falls from the upper portion of the cylinder, and but for the presence of the water or other liquid in the tank, would fall upon and perhaps solidify on the lower portion of the cylinder. However, the molten material falls into the liquid, and the part of the cylinder opposite or substantially opposite the cutting operation is protected. As this residue collects it may be removed from the tank from time to time.

I claim:

1. An apparatus for flame cutting a metallic work piece comprising, a supporting member, a structure for carrying the supporting member, means pivotally mounting said structure, means pivotally connecting said structure with the supporting member, the axes of said two means being substantially at right angles to each other, a torch carried by the supporting member for applying a cutting flame onto the work piece, a template, means on the supporting member for engaging and traversing the template for oscillating the supporting member on its axes to cause the cutting flame to traverse and cut the work along a path determined by the template, and means for adjustably varying the position of the axis of the said means for pivotally mounting said structure relative to the work piece independently of the pivotal connection between the structure and the supporting member to vary the angle of the cut through the work piece.

2. An apparatus for flame cutting a metallic work piece comprising, a supporting member, a structure for carrying the supporting member, means pivotally mounting said structure, means pivotally connecting said structure with the supporting member, the axes of said two means being substantially at right angles to each other, a torch carried by the supporting member for applying the cutting flame onto a work piece, a template, means on the supporting member for engaging and traversing the template for oscillating the supporting member on its axes to cause the cutting flame to traverse and cut the work along a path determined by the template, and means for adjustably and independently varying the position of the axis of the connection between the supporting structure and the supporting member to vary the angle of the application of the flame to the work piece.

3. An apparatus for flame cutting a metallic work piece comprising, a supporting member, a structure for carrying the supporting member, means pivotally mounting said structure, means pivotally connecting said structure with the supporting member, the axes of said two means being substantially at right angles to each other, a torch carried by the supporting member for applying a cutting flame onto a work piece, a template, means on the supporting member for engaging and traversing the template for oscillating the supporting member on its axes to cause the cutting flame to traverse and cut the work along a path determined by the template, means for adjustably and independently varying the positions of the axes of the mounting for said structure and the pivotal connection between the structure and the supporting member both substantially in the direction of the extent of the flame, and in a direction substantially at right-angles to the flame for varying the angles of the application of the flame to the work.

4. An apparatus for cutting a hole in a metallic cylinder comprising, means for supporting the cylinder substantially on a fixed axis, a supporting member, a torch carried by the supporting member for applying a cutting flame to the cylinder, a supporting structure, a pivotal mounting for the supporting structure, means pivotally connecting the supporting structure and the supporting member, a template, means carried by the supporting member and arranged to engage and traverse the template for causing oscillation of the supporting member on the axes of the pivotal mounting and pivotal connecting means, whereby the flame traverses the work piece in a path corresponding to that of a template and means for supporting the pivotal mounting of said structure including means adjustable both horizontally and vertically relative to the axis of the cylinder for varying the angle of the application of the flame to the cylinder.

5. An apparatus for cutting a hole in a metallic cylinder comprising, means for supporting the cylinder substantially on a fixed axis, a supporting member, a torch carried by the supporting member for applying a cutting flame to the cylinder, a supporting structure, a pivotal mounting for the supporting structure, means pivotally connecting the supporting structure and the supporting member, a template, means carried by the supporting member and arranged to engage and traverse the template for causing oscillation of the supporting member on the axes of the pivotal mounting and pivotal connecting means, whereby the flame traverses the work piece in a path corresponding to that of a template, means for carrying the pivotal connection between the said structure and said supporting members including means adjustable axially of the cylinder and in a direction at right-angles to the axis of the cylinder to vary the angle of the application of the flame to the work piece.

6. An apparatus for cutting a hole in a metallic cylinder comprising, means for supporting the cylinder substantially on a fixed axis, a supporting member, a torch carried by the supporting member for applying a cutting flame to the cylinder, a supporting structure, a pivotal mounting for the supporting structure, means pivotally connecting the supporting structure and the supporting member, a template, means carried by the supporting member and arranged to engage and traverse the template for causing oscillation of the supporting member on the axes of the pivotal mounting and pivotal connecting means, whereby the flame traverses the work piece in a path corresponding to that of a template, means for supporting the pivotal mounting of said structure including means adjustable both horizontally and vertically relative to the axis of the cylinder and means for carrying the pivotal connection between the said structure and said supporting member including means adjustable axially of the cylinder and in a direction at right-angles to the axis of the cylinder to vary the angle of the application of the flame to the work piece.

THORNTON L. URQUHART.